United States Patent [19]

Schoettle et al.

[11] E Re. 29,976

[45] Reissued Apr. 24, 1979

[54] TAPE CARTRIDGE WHICH IS NORMALLY CLOSED BUT IS PIVOTED TO OPEN POSITION WHEN TAKEN INTO USE, AND TRANSPORT APPARATUS FOR SUCH A CARTRIDGE

[75] Inventors: Klaus Schoettle, Heidelberg; Heinrich Wittkamp, Mannheim; Karl Uhl, Frankenthal; Gerhard Rotter, Ludwigshafen, all of Fed. Rep. of Germany; Robert Gertz, Laguna Hills, Calif.

[73] Assignee: BASF Aktiengesellschaft, Ludwigshafen, Fed. Rep. of Germany

[21] Appl. No.: 866,411

[22] Filed: Dec. 30, 1977

Related U.S. Patent Documents

Reissue of:

[64] Patent No.: 3,987,489
Issued: Oct. 19, 1976
Appl. No.: 533,177
Filed: Dec. 16, 1974

[30] Foreign Application Priority Data

Dec. 22, 1973 [DE] Fed. Rep. of Germany ..... 2364397

[51] Int. Cl.[2] ..... G11B 23/08; G11B 15/32

[52] U.S. Cl. ..... 360/132; 242/199

[58] Field of Search ..... 360/132, 95, 85, 93; 242/199

[56] References Cited

U.S. PATENT DOCUMENTS 3,788,576 1/1974 Buslik ..... 360/132

*Primary Examiner*—Robert S. Tupper
*Attorney, Agent, or Firm*—Keil & Witherspoon

[57] ABSTRACT

The invention relates to a cartridge for a recording medium in tape or strip form and a transport apparatus for use with such a cartridge, both being favorably matched to one another according to the invention. The cartridge consists essentially of a housing which is composed of parts pivotally connected to one another and, in the closed position, completely encloses a roll of tape wound on a hub. In the open position of the cartridge, at least part of the roll of tape is so exposed that the roll can be rotated and the tape or strip scanned on the apparatus. The transport apparatus is provided with appropriately designed means for receiving the cartridge which, when some of its components are pivoted, swings apart the parts of the cartridge, which is placed upon the apparatus in the closed position, and thus opens the cartridge.

11 Claims, 7 Drawing Figures

TAPE CARTRIDGE WHICH IS NORMALLY CLOSED BUT IS PIVOTED TO OPEN POSITION WHEN TAKEN INTO USE, AND TRANSPORT APPARATUS FOR SUCH A CARTRIDGE

Matter enclosed in heavy brackets [ ] appears in the original patent but forms no part of this reissue specification; matter printed in italics indicates the additions made by reissue.

This invention relates to a cartridge for a recording medium in tape or strip form, particularly a magnetic tape, and a transport apparatus for use with such a cartridge, the latter consisting of a housing with lower, upper and side walls which enclose a roll of tape wound on a hub, the roll of tape being capable of being shifted into a position in which its peripheral surface makes contact with a transport apparatus-associated drive member at the earliest during insertion of the cartridge in apparatus-associated receiving means for the cartridge.

A tape transport apparatus for use with a tape cartridge of the this type is described in German Published Application (DOS) No. 1,955,560. Here, the cartridge is of circular shape and has a open window in its periphery which cannot be closed and which permits a drive member to enter the cartridge for rotation of a supply roll housed therein, and also allows the tape to the withdrawn from the cartridge. The supply roll rotates upon an axle journaled in the opposite side walls of the circular cartridge but is not slidably displaceable. Movement of the roll toward the drive member, to compensate for the decreasing pack diameter, is effected by guided displacement of the whole cartridge, guidance being effected by means of guide pins on the lower cartridge wall and a cooperating guide slot in the tape deck, and also by means of guide members which embrace the cartridge at the periphery on opposite sides.

In all embodiments of this prior art tape transport apparatus, spring-loaded displacement members bear against the outside of the cartridge housing and thus urge the roll of tape toward the drive member only indirectly. The hub is only provided with primative bearing means in the form of the abovementioned journals which rotate in apertures in the opposite side walls of the circular cartridge. The main disadvantages of the above-described tape transport apparatus and cartridge are that a. the tape and the tape pack as a whole are not adequately protected against external influences by the cartridge, b. the primitive bearing means are unsuitable for high rotational speeds of the pack within the cartridge, c. more or less frictionless guidance of the cartridge on the transport apparatus is extremely expensive, d. correct insertion of the cartridge between the lateral guide members is not guaranteed, e. since the drive member enters the cartridge, the cartridge must be precisely located, so that the drive member does not come into contact with the cartridge housing, f. the circular shape of the cartridge makes handling and storage and filing more difficult for the amateur, g. owing to the fact that the cartridge must be precisely located, the requisite apparatus-associated means for guiding and displacing the cartridge are very elaborate and are consequently more liable to give trouble.

It is an object of the invention to provide an improved cartridge for a recording medium in tape or strip form and an improved transport apparatus for use therewith. It is a further object of the invention to improve magnetic tape cartridges and tape recorders, to render their operation more reliable, their handling simpler and their mass production more economical. It is yet another object of the invention to provide a cartridge which is simpler to store and file.

According to the present invention, these and other objects are achieved with a cartridge for a recording medium in tape or strip form and tape transport apparatus for use therewith, especially a magnetic tape cartridge and a tape recorder for use therewith, the cartridge consisting of a housing with lower, upper and side walls which enclose a roll of tape wound on a hub, the roll after insertion of the cartridge in apparatus-associated means for receiving it, being in a position or being capable of being brought into a position in which the peripheral surface of the roll of tape makes contact with an apparatus-associated drive member, wherein the housing consists of two parts of approximately equal size which are pivotally connected together by connecting means in such a way that the said two parts in the closed position of the cartridge, completely enclose the roll of tape and, in the open position of the cartridge, are swung apart by apparatus-associated pivoting means, at least part of the peripheral surface of the tape roll being so exposed that the roll can be rotated by an apparatus-associated drive member.

Such a design ensures maximum protection for the tape pack cartridge and transport apparatus while making it easy to mass-produce the units concerned.

The cartridge housing can be produced in one piece or from a number of pieces. The roll of tape can be advantageously inserted in the cartridge housing after the housing and its associated elements have been assembled, so that the risk of damage to the tape roll is considerably reduced.

The lower and upper walls of the cartridge may each be provided with at least one aperture through which an apparatus-associated, rotatably and—if desired—displaceably mounted spindle can enter, so that the roll of tape can be rotated essentially inside the cartridge and the tape can, if necessary, also be scanned therein.

In an advantageous embodiment of the cartridge, spring means are provided which hold the two cartridge parts together.

In a particularly advantgeous embodiment of the cartridge two resilient members are provided in the form of a first spring arranged near the point at which the cartridge parts pivot and a second spring arranged near those sections of the cartridge parts which describe the largest arc during the pivoting movement.

By using two springs, which are advantageously arranged the greatest possible distance apart, great rigidity is imparted to the cartridge in all positions of the housing parts, thus enabling the cartridge to resist flexural stress and shearing forces, and an increase in the force holding the cartridge parts together, especially in the closed position, is also achieved.

In a further embodiment of the invention, the second spring is an element made of resilient material and having an aperture through which at least part of the roll of tape can project when the cartridge is open, the said element cooperating on each side with a projection provided on each cartridge part while the cartridge is closed, in order to keep it closed, whereas the said element cooperates with one further projection on each cartridge part while the cartridge is open, in order to limit the pivoting angle of the cartridge parts.

Such a spring design having the various functions described above has proved to be both economical and advantageous in operation.

In a further particularly advantageous embodiment of the invention, the cartridge parts are provided with teeth in the region where the parts meet, which teeth improve the rigidity of the cartridge in the closed position.

A very high degree of rigidity which protects the cartridge against flexural stress in particular is achieved in this way, the rigidity already achieved with springs of suitable design and arranged in an appropriate manner being further increased.

These teeth are formed by regions of the lower and upper walls of the cartridge parts, which regions over- and underlap each other.

In yet another advantageous embodiment of the invention, the cartridge is provided on the inside with resilient members which make contact with at least part of the peripheral surface of the roll of tape, especially when the cartridge is closed, in order to hold the roll of tape together. In this way, unintentional unrolling of the tape or the leader tape from the roll is effectively prevented. In a very simple embodiment of the invention, these resilient member consist of strips of elastic material which are held between projections provided on the cartridge parts.

According to the invention, the transport apparatus for use with the above-described cartridge is provided with cartridge receiving means consisting essentially of a split base portion and actuating members. The latter engage the cartridge parts at predetermined points, and the parts of the base are swung apart with the cartridge parts by means of a pivoting mechanism.

The above-described receiving means, which is easy to manufacture and reliable in operation, ensures the trouble-free opening of the cartridge inside the machine, so that damage to the tape and tape pack is avoided.

Further details of an embodiment of the invention will now be described with reference to the accompanying drawings, in which FIG. 1 shows receiving means for a cartridge according to the invention which is shown here prior to insertion;

Figure 1:
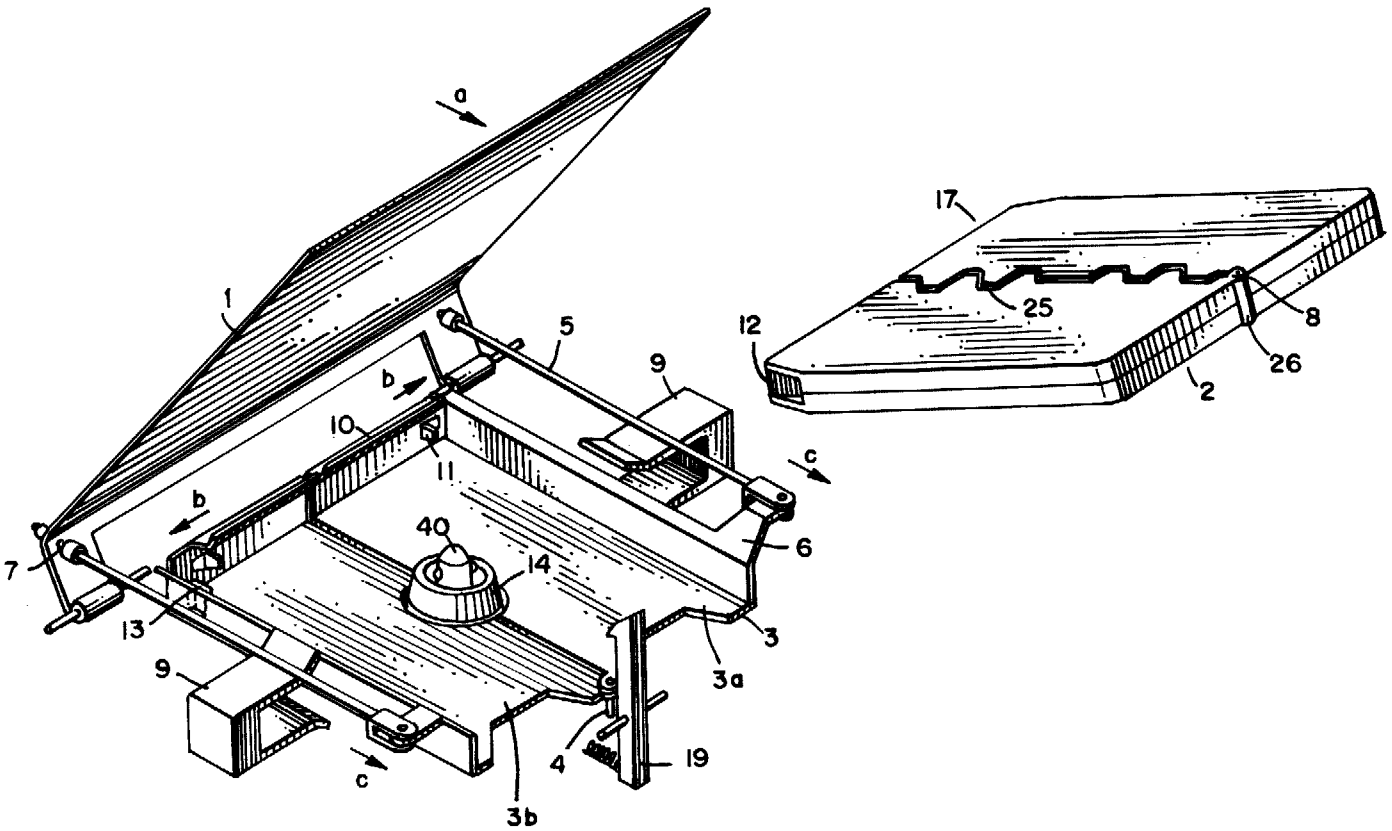
Figure 7:
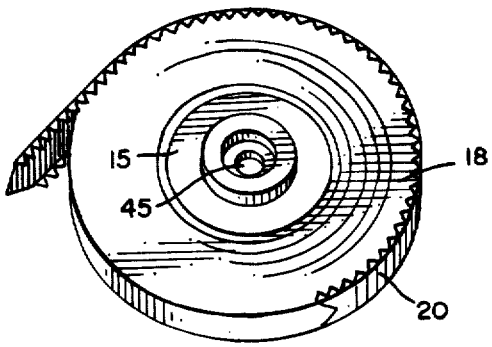
FIG. 7 shows a roll of tape with leader for a cartridge of the invention.

FIG. 1 shows receiving means or, rather, a simple loading mechanism for a cartridge 2. When the apparatus-associated lid 1 is opened it exposes a trough 3 into which the closed cartridge 2 can be inserted manually. The trough 3 consists of two parts and is preferably made of stamped-out and appropriately bent sheet metal. The two parts 3a and 3b can be rotated about a pivot 4 independently of one another. The two apparatus-associated trough components 3a and 3b are directly connected to the lid 1 via rods 5 which are pivotally connected to tabs 6 and loosely attached to lid 1 at points 7 for pivotal movement. When the lid 1 is raised the trough 3 is closed and ready to receive the cartridge. When the lid 1 is depressed in the direction of arrow a, the two trough components 3a and 3b pivot through a certain angle in opposite directions, as indicated by arrows b. The pivoting movement of the trough components 3a and 3b is brought about by movement of the rods 5 in the direction of arrows c. When a cartridge is inserted, the pivot 4 for the trough components coincides with the pivot 8 for the cartridge parts, the opening angle of the trough components corresponding to the opening angle of the cartridge parts. When the apparatus-associated trough 3 swings apart retaining means 9 embrace the trough components 3a and 3b and the upper walls 21 of the cartridge parts or directly embrace the upper, lower and side walls 21, 22 and 33 of the cartridge parts through slots (not shown) in trough components 3a and 3b to hold the cartridge parts at a predetermined height so that the roll of tape (FIG. 7) can be wound and unwound without making contact with parts of the cartridge housing.

The cartridge 2 is inserted in the trough 3 at an angle with the front of the cartridge 17 pointing forward and downward. The front 17 is pushed below the overhanging lip 10. The projections 11 on the right and the left simultaneously engage apertures at the front of the cartridge and urge the front spring inside the cartridge back to such an extent that the cartridge, after having been pressed home in the trough, is ready to be opened. To prevent the cartridge from being incorrectly inserted, for example the wrong way round, the cartridge 2 is provided with a recess 12 on one side, and the corresponding apparatus-associated trough part with a projection 13 for cooperation with said recess. When the cartridge 2 is inserted, a ball pressure mechanism 16 on shaft 40 is actuated and the hub 15 is pressed against the conical surface of the hub-receiving member 14. As a result, the roll of tape 18 is connected to the transport apparatus, ready for operation. A spring-loaded lever 19 is an additional safety feature which ensures that the cartridge 2 attains its end position after it has been inserted. It is possible to so connect the lever 19 to a switching mechanism (not shown) that the machine cannot be operated until the cartridge 2 is properly located in the trough.

Figure 5:
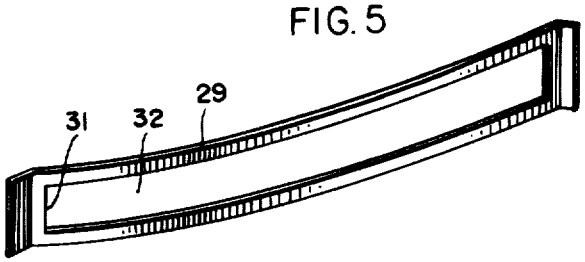
FIG. 5 shows a locking spring for the cartridge.
Figure 6:
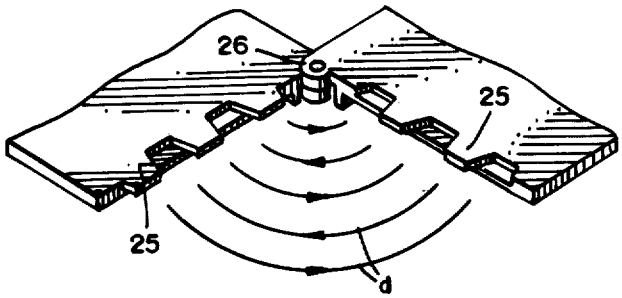
FIG. 6 shows a detail of the teeth of the cartridge parts.

Other loading mechanism designs for the cartridge, which is now to be described in more detail, are conceivable. The cartridge 2 is a single-reel cartridge. The tape is wound on the aluminum hub 15 to form roll 18 (cf. FIG. 7). At its periphery, the roll 18 is provided with a leader tape 20 which holds itself to the edges of the outer turns of tape by means of lateral teeth, so that the roll 18 is held together and outer turns of tape cannot slip off the roll. When the cartridge 2 is closed (cf. FIG. 3) the hub 15 is held between upper and lower walls 21 and 22 of the cartridge 2 by means of ribs (not shown) in such a way that it is prevented from rotating and being displaced vertically and radially when the cartridge is handled. An additional feature for preventing rotation of the roll 18 may consist of toothed elements (not shown) on the lower side of the hub 15 which engage matching recesses in or projections on the lower wall 22 of the cartridge. The cartridge 2 consists of two parts 23 and 24 of equal size which are pivotally connected to one another by means of a hinge 26 for example. In an advantageous embodiment of the invention, the cartridge parts 23 and 24 each consist of two simple injection moldings made of plastics material, connected to one another in a suitable manner, for example by ultrasonic welding or by screws. The cartridge parts 23 and 24 completely enclose the tape roll 18 when the cartridge 2 is closed, so that there is no direct access to the tape from the outside at any point. The tape roll 18 is thus afforded optimum protection against mechanical damage and dust. Where the two cartridge parts 23 and 24 meet, portions of the lower and upper surfaces 22 and 21 over- and underlap, forming interlocking teeth 25 (see arrows d in FIG. 6) which bring about an increase in the mechanical strength of the cartridge 2 in the plane of separation, make the cartridge virtually dusttight and improve protection of the tape and the tape pack 18 against mechanical damage. Other interlocking arrangements may also be used, for example a tongue-and-groove connection. An additional safeguard against bending of the cartridge 2 in the plane of separation consists of a first and second spring. The first spring 27—the closing spring—is arranged near the hinge 26. It may be a leaf spring, and its ends may be retained in suitable grooves 28 provided in each of the two cartridge parts 23 and 24. The arrangement and shape of the spring 27 in the drawing make it clear that a force which causes the teeth 25 to firmly interlock is exerted on the cartridge parts 23 and 24. The second spring 29 will be referred to hereinafter as the "front spring", of which one embodiment is shown in FIG. 5. When the cartridge 2 is in the closed position, the spring 29 engages the wedge-shaped projections 30, the latter cooperating with an aperture 32 in the spring near the edges 31. The steeply inclined sides of the projections 30, which face the side walls 33 of the cartridge, constitute a simple means of compensating for slight differences in length of the front spring 29 and/or housing tolerances which occur during manufacture. The rectangular opening 32 in the spring 29 is so dimensioned at least part of the tape roll 18 can pass therethrough without the turns of the tape pack or the leader tape coming into contact with the spring. The spring 29 in the relaxed state is slightly bowed, so that it bears against the inside of the cartridge front 17 after it has been fitted in the cartridge, a further retaining force being therefore applied to the teeth 25 when the cartridge 2 is in the closed position. In order to open the cartridge 2, projections 11 (see FIG. 1) pass through the apertures or slots 34 in the front wall of the cartridge opposite the ends of the spring 29, so that the latter are bent back and thus lifted clear of the projections 30. If the cartridge parts 23 and 25 are now swung apart as described, smaller projections 35 engage the edges 31 of the spring 29, thus limiting the opening angle. The wedge shape of the projections 30 enables the curved ends of the spring 29 to readily slide up and over the projections when the cartridge is closed.

Figure 2:
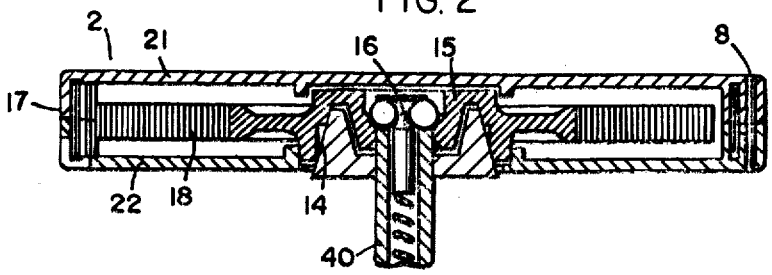
FIG. 2 is a sectional view taken along the line II—II of the cartridge of the invention shown in FIG. 3.

As can be seen from FIG. 2, the springs 27 and 29 are confined so narrowly over their entire length inside the cartridge 2 that even slight bending or warping of the cartridge in the plane of separation of the cartridge parts 23 and 24 causes the springs 27 and 29 to bear against the inner surfaces of the lower and upper cartridge walls, sufficiently strong resistance thus opposing any further bending or warping.

The spring 29 may also be designed in any other suitable manner, for example it may be in the form of a rectangular loop of wire. It is not absolutely necessary to provide an aperture in the spring 29: an elongated, substantially U-shaped spring member would also be sufficient. The spring 29 can be readily inserted subsequently in the otherwise complete cartridge 2. Using special tools, it is also possible to remove the spring 29, for example, in order to replace it, to exchange the tape roll 18 or to repair the cartridge.

To compensate for varying pack diameters due to variations in the thickness of the tape used and/or to different lengths of tape (for example in the case of pre-recorded cartridges), a spring 36 (preferably made of a plastics material such as polyester) may be inserted in each half of the housing between projections 37 provided on each of the cartridge parts 23 and 24, the position of the springs being governed by the size of the full pack.

When the cartridge 2 is closed, the periphery of the pack is always in contact with these springs 36. As a result, the pack 18 is effectively held together and the leader tape 20 cannot detach itself from the pack.

In an advantageous embodiment of these retaining springs, they are provided with flanged edges (not shown) which embrace the tape pack at the periphery. As may be seen from FIG. 4, the springs 36 are not in contact with the periphery of the pack when the cartridge is open.

Figure 3:
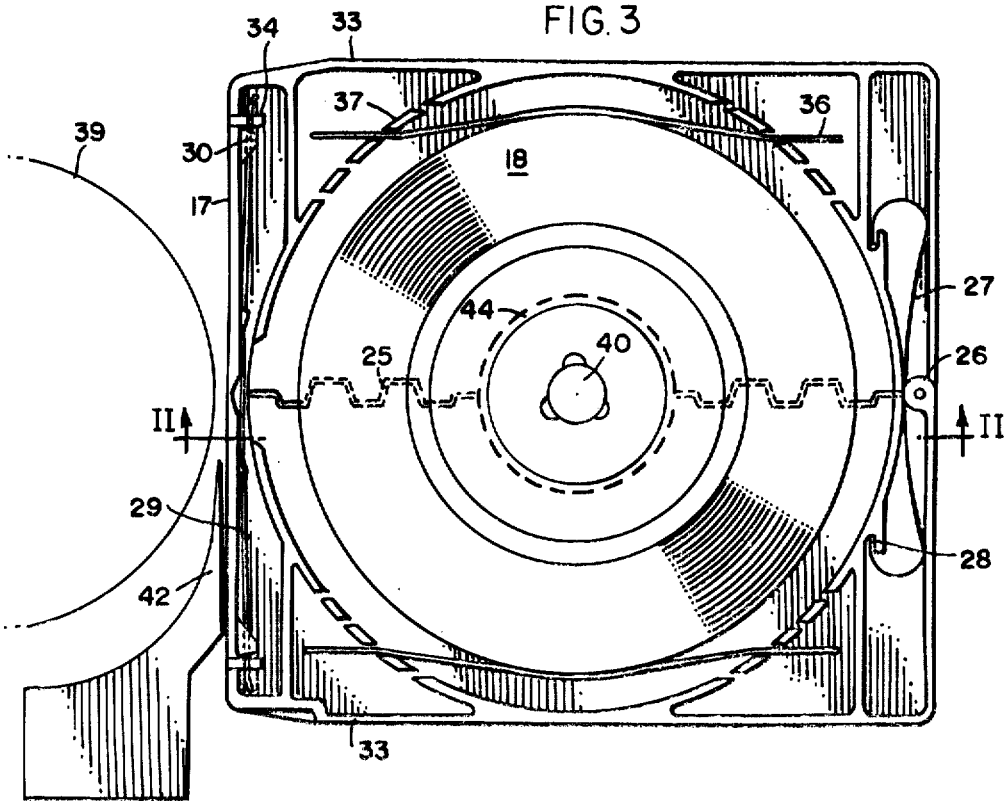
FIG. 3 shows the cartridge of the invention in the closed position on the transport apparatus.
Figure 4:
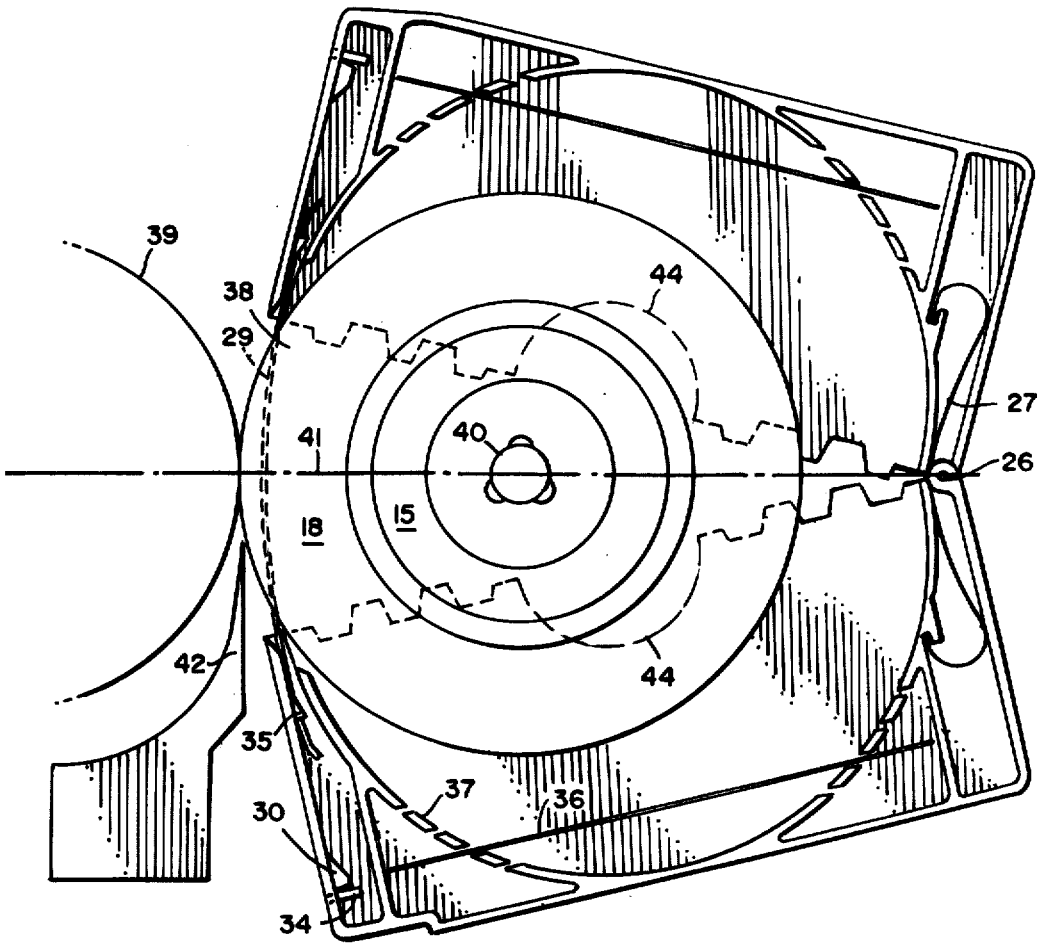
FIG. 4 shows the cartridge of FIG. 3 in the open position, the roll of tape being driven by the transport apparatus.

A comparison of the positions of the tape roll 18 in FIGS. 3 and 4 shows that the roll 18 in the latter drawing has already been pushed out of the aperture 38 and has reached a position in which it makes contact with the peripheral surface of a transport apparatus-associated drive member 39 (shown diagrammatically in the form of a semi-circle) which drives two tape packs in a transport apparatus operating on the contact-winding principle. In transport apparatus of this type, in order to maintain adequate compressive forces between the drive member—which will be referred to hereinafter as the "capstan"—and the tape packs, it is necessary for the packs to advance and retreat relative to the capstan during feeding of the tape to take the decreasing and increasing pack diameters into account. In an apparatus of this type, the shafts carrying the tape packs are adavantageously so mounted that they can be radially displaced via springs toward and away from the capstan.

The shaft 40 which carries the hub 15 is mounted in the described manner so as to be displaceble along the central axis 41 of the cartridge toward the capstan 39. The hub 15 is thus displaced within the sector between the cartridge parts 24 and 24 via the shaft 40. The pack 18 is a full tape pack from which the leading end of the leader 20 (shown in FIG. 7) is peeled by means of a peeling blade 42. The leader 20 is then guided around the capstan 39 by guide means not shown here and fastens itself to a second hub to commence the formation of a take-up roll (not shown), the tape being scanned by scanning means (not shown) at it is fed from the supply roll to the take-up roll. The leader 20 is made of a plastics film which is usually thicker than the magnetic tape itself and is spliced to the latter by known means. The cartridge design ensures that the leader 20 inside the cartridge 2 cannot detach itself from the pack; particularly the springs 36 which hold the turns of the pack together play a big part in achieving this. The distance between the periphery of the roll of tape and the inside cylindrical walls of the cartridge is advantageously such that the leader remains in contact with the periphery of the pack. Similarly, the other spaces between the pack and cartridge parts are so dimensioned that the leader tape cannot jam in the cartridge or detach itself from the pack when the pack is mistakenly turned in the opposite direction, even if the end of the leader tape is standing slightly away from the periphery of the pack.

Detachment of the leader tape 20 from the pack prior to threading on the transport apparatus would give rise to disturbances in predominantly automatic threading operations. After the magnetic tape has been completely unwound, the empty hub 15 bears against the periphery of the capstan. Rewinding of the magnetic tape from the takeup roll onto hub 15 of the cartridge 2 can then be effected until the maximum pack diameter has been achieved.

Referring to the embodments described above, it will be seen that the most important advantages of the cartridge and the transport apparatus according to the invention are that, owing to the design of the cartridge, the tape pack, before the cartridge is placed in position on the apparatus is effectively protected against all external influences such as dust, dirt and mechanical damage, that operation of the cartridge, after it has been placed in position on the apparatus, is both reliable and largely automatic without there being any risk of the cartridge or the transport apparatus being damaged and that the cartridge as well as the components of the receiving means for the cartridge can be mass-produced easily and economically. Another important advantage over the state of the art is that the cartridge is firmly locked on the transport apparatus and only the roll of tape is displaced. The simple design of the cartridge and its simple mode of operation on the transport apparatus makes a simple and cheap loading mechanism possible.

Notwithstanding the above-described embodiment of the invention, the cartridge described here can also be produced without aperture 44 for the admission of a spindle or shaft. Nor is it neccessary for the width of the magnetic tape to be less than the pack diameter. Further embodiments of the cartridges and tape transport apparatus for use therewith are conceivable within the scope of the claims, which embodiments are also claimed.

We claim:

1. A tape cartridge assembly for use with a tape transport apparatus having a tape driving capstan, a spindle mounted for rotation and also for movement transversely to its axis towards said capstan, and cartridge receiving means provided with actuating members, said tape cartridge assembly comprising:

a housing of flat rectangular shape with lower, upper and side walls, at least said lower walls having an aperture therein, a flangeless hub and a roll of tape wound on said hub;

said hub having an opening which in the closed position of said cartridge is located for access, through said aperture, by said spindle when said cartridge is placed, in a direction generally axially of said hub, in a predetermined position on said cartridge receiving means;

said housing being split into two parts of approximately equal size and having means pivotally connecting said two parts to allow movement of said two parts between a closed position in which said housing encloses said roll of tape, and an open position in which at least a part of the peripheral surface of said roll of tape is exposed to permit engagement therewith of said tape driving capstan;

said housing parts having further apertures permitting entry therethrough of said actuating members;

spring means in said housing which urge said parts against each other toward closed position;

means in said housing for normally latching said parts together in said closed position, limiting the pivoting angle of said parts in said open position, and cooperating with said cartridge walls to maintain the rigidity of the cartridge in its closed and open positions, said latching means, upon engagement by said actuating members incident to said entry, unlatching the housing parts to permit said parts to be pivotally moved apart under the control of said cartridge receiving means and hence said roll of tape to be moved, in response to the transverse displacement of said spindle, towards said capstan for engagement therewith while said cartridge is retained by said receiving means in said predetermined position on said apparatus; and holding means within said housing which in the closed position of the cartridge holds the roll of tape positioned for access by said spindle.

2. A tape cartridge assembly according to claim 1 wherein said spring means is disposed within said housing near the point at which said housing parts pivot and wherein said latching means is in the form of a spring disposed in said housing on the side thereof opposite said point.

3. A tape cartridge assembly according to claim 2 wherein there are provided in each housing part first and second projections; wherein said spring is an element of resilient material having a longitudinal opening therein; wherein, as said roll of tape in the open position of said cartridge is being moved toward said capstan, at least a part of said roll passes through said opening in an outward direction, said opening being dimensioned so that said part of the roll in so passing through said opening clears said element; and wherein said element cooperates, in the closed position of the cartridge, with said first projection to keep said parts latched together, and in the open position of the cartridge, with said second projection so as to limit the pivoting angle of the housing parts.

4. A tape cartridge assembly according to claim 1 wherein the lateral dimension of said latching means substantially corresponds to the lateral dimension of said tape roll so that said latching means cooperates with said cartridge walls to maintain the rigidity of the cartridge in its closed and open positions.

5. A tape cartridge assembly according to claim 1 wherein the housing parts, in the region where they meet, are provided with means for forming a substantially dust-proof seal for the closed cartridge and for imparting rigidity to the cartridge in all positions of the housing parts.

6. A tape cartridge assembly according to claim 5 wherein the last-mentioned means include teeth in each housing part in the region where the housing parts meet.

7. A tape cartridge assembly according to claim 6 wherein the lower and upper walls of the housing parts are each provided, in said region, with mutually abutting shelf portions and, in overlapping relationship thereto, with mutually cooperating tooth portions which alternately protrude and recede from the plane of abutment of said shelf portions.

8. A tape cartridge assembly according to claim 1 wherein said holding means include resilient members which in the closed position of the cartridge resiliently contact at least a part of the peripheral surface of the roll of tape to keep the roll of tape together.

9. A tape cartridge assembly according to claim 8 wherein elevated portions are provided on said housing parts and wherein said resilient members are formed by strips of elastic material which are held by the said portions.

10. A tape cartridge according to claim 9 wherein a plurality of said portions are provided at different positions so that tape rolls of different maximum diameter can be held together by said strips.

11. In combination, a tape cartridge assembly and a tape transport apparatus for use with said assembly, said tape transport apparatus including a tape driving capstan, a spindle mounted for rotation and also for movement transversely to its axis towards said capstan, and cartridge receiving means provided with actuating members, said tape cartridge assembly comprising:

a housing of flat rectangular shape with lower, upper and side walls, at least said lower walls having an aperture therein, a flangeless hub and a roll of tape wound on said hub;

said hub having an opening which in the closed position of said cartridge is located for access, through said aperture, by said spindle when said cartridge is placed, in a direction generally axially of said hub, in a predetermined position on said cartridge receiving means;

said housing being split into two parts of approximately equal size and having means pivotally connecting said two parts relative to each other about an axis perpendicular to the bottom wall of the cartridge to allow movement of said two parts between a closed position in which said housing completely encloses said roll of tape, and an open position in which at least a part of the peripheral surface of said roll of tape is exposed to permit engagement therewith of said tape-driving capstan;

said housing parts having further apertures permitting entry therethrough of said actuating members;

spring means in said housing which urge said parts against each other toward closed position; and means normally latching said parts together in said closed position;

and said cartridge receiving means being further provided with:

a pair of mutually pivoted base portions leaving an access space therebetween, said spindle, with said cartridge placed on said receiving means, entering, through said access space, said aperture in said cartridge housing and said opening in said hub, and said actuating members being disposed in said base portions, respectively so that they enter said further apertures in said cartridge housing parts when the cartridge is placed in position on said cartridge receiving means to release said latching means, and a pivoting means for swinging said pair of base portions with the actuating members thereon apart to open the cartridge and hence permit said roll of tape to be moved, in response to the transverse displacement of said spindle, towards said capstan for engagement therewith while said cartridge is retained in said predetermined position on said apparatus.

* * * * *